Jan. 13, 1925.
G. H. EARMAN
1,522,947
WINDMILL GOVERNOR
Filed Jan. 11, 1924
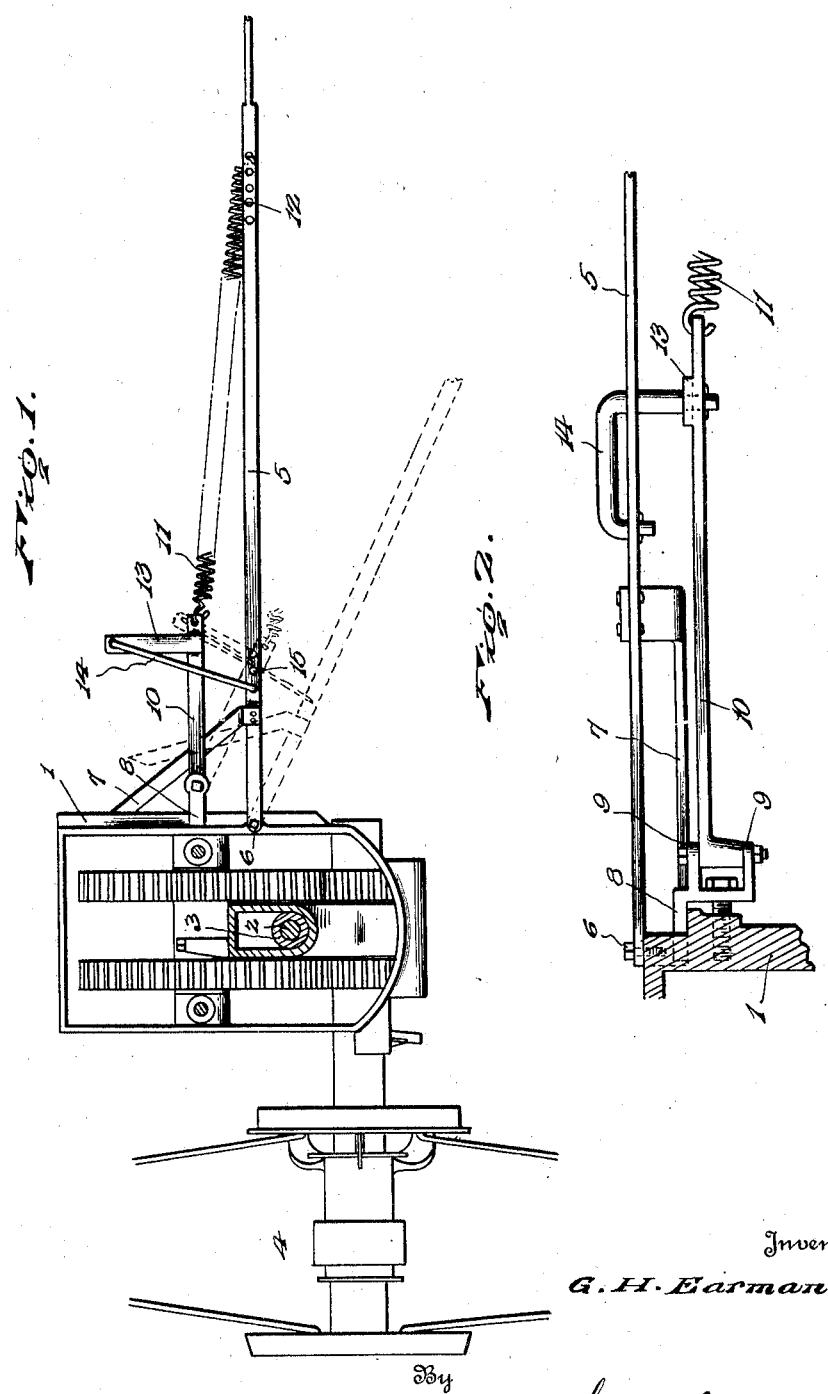
Inventor
G. H. Earman.
By
Lacey & Lacey, Attorneys Patented Jan. 13, 1925.

1,522,947

UNITED STATES PATENT OFFICE.

GEORGE H. EARMAN, OF HARRISONBURG, VIRGINIA.

WINDMILL GOVERNOR.

Application filed January 11, 1924. Serial No. 685,638.

*To all whom it may concern:*

Be it known that I, GEORGE H. EARMAN, a citizen of the United States, residing at Harrisonburg, in the county of Rockingham and State of Virginia, have invented certain new and useful Improvements in Windmill Governors, of which the following is a specification.

My present invention relates to windmills and has special reference to the governing mechanism or means for returning the wheel into the wind after it has been turned out of the wind through the action of the governing vane. Mechanism has been heretofore devised in which a strong contractile spring has been arranged between the vane arm and the windmill head which will yield under a strong wind to permit the wheel to swing out of the wind and automatically contract to return the wheel to its working position after the wind subsides. In such mechanism, however, one end of the spring has been secured to a relatively fixed part on the windmill head so that the tension of the spring was not uniform and it would increase as the wheel turned out of the wind so that on the reverse action the spring would operate too quickly and the speed of the wheel would be uneven and, in many instances, so rapid as to cause damage to some of the parts. It is, therefore, a particular object of my invention to provide a connection between the spring and the windmill head which will permit the spring to more closely follow the movements of the vane or the head and, therefore, maintain substantially a uniform tension so that the return movement of the wheel will be steady and breakage or other damage of the parts will be avoided. This object I attain in the use of such a construction as is illustrated in the accompanying drawings, and the invention resides in certain novel features which will be particularly pointed out in the appended claims.

In the drawing:

Figure 1 is a view, partly in plan and partly in horizontal section, of a portion of a windmill having my improvements embodied therein, and Fig. 2 is an enlarged sectional elevation of the improved device.

In the drawing, the reference numeral 1 indicates the windmill head which is mounted to turn about the power rod 2 and the post 3 and carries the wind wheel, a portion of which is shown at 4. The vane arm 5 is pivoted at its inner end 6 to the head 1, and the vane (not shown) is secured to and carried by the outer end of said arm. A stop bar 7 is secured rigidly to the said arm near the inner end thereof and is adapted to impinge against the head 1 so as to normally maintain the vane arm at a right angle to the head and parallel with the shaft of the wind wheel. In carrying out my present invention, I secure rigidly to the windmill head at the side of the pivot 6 a bracket 8 which is provided at its outer side with vertically spaced lugs 9 to and between which is pivotally attached the inner end of a spring arm 10, and the retracting spring 11 is attached at its inner end to the outer end of the said arm 10 and at its outer end to the vane arm 5, as shown in Fig. 1. The vane arm is provided with a longitudinal series of openings 12, in any one of which the outer end of the spring may be engaged so that the tension of the spring may be regulated as judgment and experience may dictate. Near the outer end of the spring arm 10, I provide a lateral arm 13 which may be formed integrally with the spring arm or rigidly secured thereto, and a link 14 is pivotally connected at one end with the free end of this lateral arm 13 and at its opposite end with the vane arm 5, the vane arm being provided with a plurality of openings 15 to receive the end of the link whereby the relative position of the vane arm and the spring arm may be varied to suit any given circumstances.

The normal position of the parts is shown in full lines in Fig. 1. Should the wind rise to such a degree as to tend to swing the wind wheel to the side, the vane and the parts associated therewith will assume the position shown in dotted lines in Fig. 1, relative to the wind wheel, and, when the vane thus moves out of its normal relation to the wheel, the spring 11 is obviously put under increased tension so that it tends to return the wind wheel at once to its working position. In the constructions heretofore provided, the inner end of the spring remains still relative to the outer end of the vane arm and the vane and, therefore, the increase in the tension of the spring is excessive. By my arrangement, however, the spring arm 10 follows the movement of the vane arm inasmuch as it is connected therewith through the link 14 and the lateral arm 13 and, as a result, the spring increases in tension to a less degree than is the case with the previously employed mechanism so that its contraction is not so violent and the return movement of the wheel is more even and less apt to cause damage to the head or any of the other parts.

My improved device may be readily applied to any existing windmill at a slight expense and without necessitating any very substantial structural changes therein or adding to the cost of maintenance to any appreciable degree. The improved mechanism operates efficiently to maintain the wheel in the wind under normal conditions and operates more smoothly than previous devices when in action so that breakage or other damage to any of the working parts is avoided.

Having thus described the invention, I claim:

1. In a windmill, the combination with the windmill head, and a vane arm pivoted thereto and extending laterally therefrom, of a spring arm pivotally mounted upon the side of the head adjacent the pivot of the vane arm, a spring attached to the spring arm and the vane arm respectively, and a swinging connection between the vane arm and the outer end of the spring arm, said connection being located outwardly from the side of the head.

2. In a windmill, the combination of a windmill head, a vane arm pivoted on the side of the head and extending laterally therefrom, a bracket secured rigidly to the side of the head adjacent the pivot of the vane arm and projecting laterally from the head, a spring arm pivoted to and extending laterally from the outer end of the bracket, a spring having its ends attached, respectively, to the vane arm and the outer end of the spring arm, a lateral arm secured rigidly to and extending from the spring arm near the outer end thereof, and a link having its opposite ends pivoted, respectively, to the vane arm and the outer end of the said lateral arm.

In testimony whereof I affix my signature.

GEORGE H. EARMAN. [L. S.]